Dec. 22, 1942.                D. M. THOMAS                2,306,005
                                FISH LURE
                            Filed Aug. 1, 1941
Fig. 1
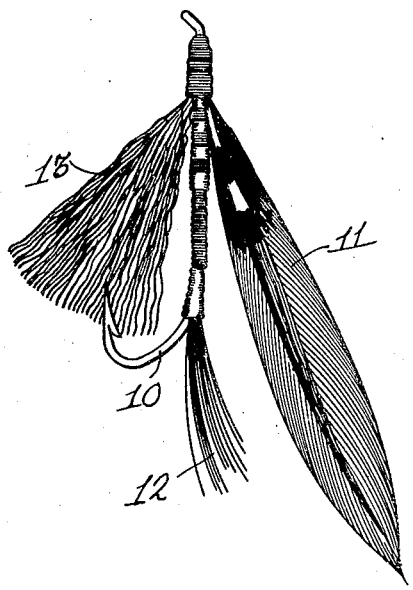
Fig. 3
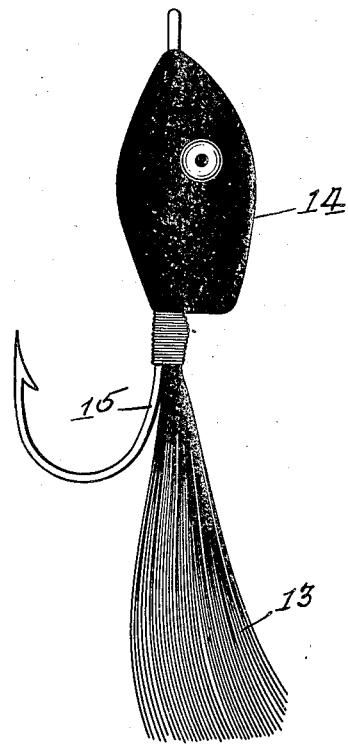
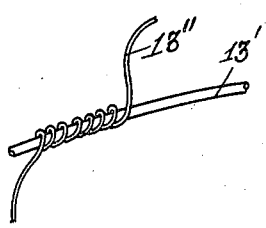
Fig. 2
Inventor:
Daniel Milson Thomas
By: Brayton W Richards
    Attorney.

Patented Dec. 22, 1942

2,306,005

UNITED STATES PATENT OFFICE 2,306,005

FISH LURE

Daniel Milson Thomas, Scarsdale, N. Y.

Application August 1, 1941, Serial No. 404,960

5 Claims. (Cl. 43—48)

The invention relates to improvements in fish lures and has for its primary object the provision of an improved fish lure which is of simple construction and highly efficient in operation.

Other objects will appear hereinafter.

The invention consists of the combinations and arrangements of parts hereinafter described and claimed.

The invention will be best understood by reference to the accompanying drawing forming a part of this specification and in which Fig. 1 is a side view of a fish lure embodying the invention;

Fig. 2 an enlarged detailed perspective view illustrating diagrammatically the method of manufacture of the strands embodied in the lure; and Fig. 3 a side view of a modified form of lure embodying the invention.

The embodiment of the invention illustrated in Figs. 1 and 2 of the drawing comprises a hook 10 having a feather 11 and a tuft of hairs or bristles 12 secured thereto in the usual way to constitute a fly. Another tuft of strands 13 is likewise secured to the hook 10 as indicated. The tuft of strands 13 is composed of a plurality of individual strands each of which is specially constructed as follows:

Each of the strands 13 comprises a central core 13' consisting of a thread which may be of silk, cotton, rayon, or other such material. A binding element 13'' in the form of a fine copper wire is wrapped or spun around the core 13' to form a coating or cover therefor. The copper wire 13'' is preferably either silver or gold plated so as to add to its attractive appearance. The use of such a tuft of strands 13 gives the lure a more life-like appearance and also provides a tuft or strands which will not be in any way affected by the water and whereby a lure is provided which will be found to be highly efficient in attracting and catching fish. The specific form and arrangement of parts indicated is a simple and effective one for the purpose.

The modified form of lure illustrated in Fig. 3 comprises a wooden body or plug 14 equipped with a suitable hook 15 and having a tuft 13 of the special strands secured thereto as indicated, thereby providing a plug lure having substantially the same advantages as that already described.

While I have illustrated and described the preferred forms of construction for carrying the invention into effect, these are capable of variation and modification without departing from the spirit of the invention. I therefore do not wish to be limited to the precise details disclosed, but desire to avail myself of such variations and modifications as fall within the scope of the appended claims.

I claim:

1. A fish lure comprising a hook having a tuft of strands attached thereto each strand comprising a flexible core having a fine wire wrapped around it.

2. The lure specified in claim 1 in which the flexible core is a thread.

3. The lure specified in claim 1 in which the wire is of plated copper.

4. The lure specified in claim 1 in which the wire is of silver plated copper.

5. The lure specified in claim 1 in which the wire is of gold plated copper.

D. MILSON THOMAS.